(12) United States Patent
Gage et al.

(10) Patent No.: US 6,188,472 B1
(45) Date of Patent: Feb. 13, 2001

(54) SYSTEM AND METHOD FOR DIRECT MEASUREMENT OF ALIGNMENT ERROR IN A FIBER COUPLER

(75) Inventors: Edward C. Gage, Apple Valley; Ronald E. Gerber, Richfield, both of MN (US); Karl A. Belser; Jerry E. Hurst, Jr., both of San Jose, CA (US)

(73) Assignee: Iolon, Inc., San Jose, CA (US)

( * ) Notice: Under 35 U.S.C. 154(b), the term of this patent shall be extended for 0 days.

(21) Appl. No.: 09/293,444

(22) Filed: Apr. 16, 1999

Related U.S. Application Data

(60) Provisional application No. 60/082,097, filed on Apr. 17, 1998.

(51) Int. Cl.[7] .................................................. G01N 21/00
(52) U.S. Cl. ............................................. 356/73.1; 385/14
(58) Field of Search ........................... 356/73.1, 399–401, 356/153; 385/88–94, 14, 24, 147, 33–35

(56) References Cited

U.S. PATENT DOCUMENTS 4,637,683 * 1/1987 Asawa .
6,023,338 * 2/2000 Bareket .

* cited by examiner

Primary Examiner—Frank G. Font
Assistant Examiner—Tu T. Nguyen
(74) Attorney, Agent, or Firm—Flehr Hohbach Test Albritton & Herbert LLP

(57) ABSTRACT

A system and method for directly measuring the alignment error in a fiber-optic coupler is disclosed. In one embodiment, an optical switch utilizes a beam deflection mirror. When the beam deflection mirror directs an incident light beam to a particular fiber, the incident light beam may enter the fiber at a location offset from the center of the fiber. When the incident beam is reflected at the opposite end of the fiber, the beam returns and exits the fiber exactly at the center of the fiber. The difference between the entry and exit points results in a return beam path different than the incident beam path. This different return beam path may be used to impinge upon a quadrant detector, whose anode currents may then contain a direct measurement of the distance between the entry and exit points on the fiber.

39 Claims, 9 Drawing Sheets

SYSTEM AND METHOD FOR DIRECT MEASUREMENT OF ALIGNMENT ERROR IN A FIBER COUPLER

CROSS-REFERENCE TO RELATED APPLICATION

This application claims the benefit of Provisional Application Ser. No. 60/082,097, entitled "Measurement of Alignment Error in a Free-Space-Beam to a Fiber Coupler," filed on Apr. 17, 1998. Additionally, this application is related to patent application Ser. No. 09/190,429, entitled "System and Method for Efficient Coupling Between Optical Elements," filed on Nov. 12, 1998. The subject matter of these two related applications is incorporated herein by reference. The related applications are commonly assigned.

BACKGROUND OF THE INVENTION

1. Field of the Invention

This invention relates generally to optical systems, and relates more particularly to a system and method for direct measurement of alignment error in a fiber coupler.

2. Description of the Background Art

Implementing techniques for efficient coupling between optical elements is a significant consideration of designers, manufacturers, and users of optical systems. Many modern optical systems use light beams, usually laser-generated, to carry various types of information. These light beams may travel through free space or through optical elements such as optical fibers. In optical systems, a light beam may alternate between travelling in free space and travelling in a fiber. This free-space-to-fiber coupling often occurs in the context of an optical switch.

Free-space-to-fiber coupling should be efficient to avoid unnecessary losses in light. Coupling efficiency is especially important in optical systems where light beams are sent through a fiber and then reflected back. If the free-space-to-fiber coupling is not efficient, then the amount of light reflected back through the fiber might be insufficient for its intended purpose.

For efficient coupling, a light beam travelling through free space must contact a fiber so that the amount of light transmitted through the fiber is maximized. The most efficient coupling between a free space beam and a fiber occurs when the light beam is centrally positioned on the core of the fiber (on the fiber center). This central positioning results in the maximum amount of light being transmitted through the fiber.

However, once positioned on the fiber center, the light beam may not remain in place. If the optical system suffers a shock or vibration, the physical components of the optical system may shift, causing the light beam to be offset from the fiber center.

Other factors may also cause the light beam to be offset from the fiber center. For example, thermal expansion of a fiber may cause it to shift, reducing the coupling efficiency between the light beam and the fiber. This type of offset poses a different problem from offset due to movements of the physical components of the optical system. A system and method for efficient coupling must be able to correct offsets due to vibration, thermal expansion, and any other cause. Therefore, an improved system and method are needed for direct measurement of alignment error in a fiber coupler.

SUMMARY OF THE INVENTION

In accordance with the present invention, a system and method are disclosed for direct measurement of alignment error in a fiber coupler. The preferred embodiment of the present invention is implemented in the context of an optical switch. In the optical switch, a light beam couples with a selected optical fiber in a fiber bundle. Efficient coupling occurs when the light beam is positioned on the center of the selected fiber.

In one embodiment of the present invention, an optical switch utilizes a beam deflection mirror. The optical switch first performs a coarse-adjustment of the beam deflection mirror to direct an incident light beam to a particular fiber terminator, after which the optical switch performs fine-adjustment steps. In the fine-adjustment steps, an incident light beam is sent through the beam deflection mirror, which may be in a position of geometric error with respect to a beam focusing lens and the axial center of a fiber terminator. If so, then the beam focusing lens impinges the incident beam upon the fiber terminator at a location that is an error distance away from the axial center. The beam travels down the fiber to a magneto-optical head, where the incident beam reflects from a magneto-optical storage media to become a return beam. The return beam then travels down the fiber and exits the fiber at the axial center of the fiber terminator.

The centered return beam departs the axial center of the fiber terminator. Because the return beam departs the axial center at a different location than the incident beam impinged upon the fiber terminator, the return beam traverses the beam focusing lens along a different path than the incident beam path. This return beam, traveling along a different path, is therefore deflected by the beam deflection mirror along a different path than the incident beam path. This different path causes a beam splitter to send a portion of the return beam to an off-center location on a quadrant detector. Anode currents in the quadrant detector carry a direct measurement of the alignment error in the optical switch.

Once the alignment error is measured, then this measured alignment error, coded on the anode currents of the quadrant detector, may be used to drive a servo-control circuit to finely-adjust the beam deflection mirror.

DETAILED DESCRIPTION OF THE PREFERRED EMBODIMENT

The present invention relates to an improvement in direct measurement of alignment error in a fiber coupler. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes a system and method for directly measuring alignment error in a fiber-optic coupler. In one embodiment, an optical switch utilizes a beam deflector. When the beam deflector directs an incident light beam to a particular fiber, the incident light beam may enter the fiber at a location offset from the center of the fiber. When this incident beam is reflected at the opposite end of the fiber, the beam returns and exits the fiber exactly at the center of the fiber. The difference between the entry and exit points results in a return beam path that is different than the incident beam path. This different return beam path may be used to impinge upon a quadrant detector, whose anode currents may then contain a direct measurement of the distance between the entry and exit points on the fiber.

Figure 1:
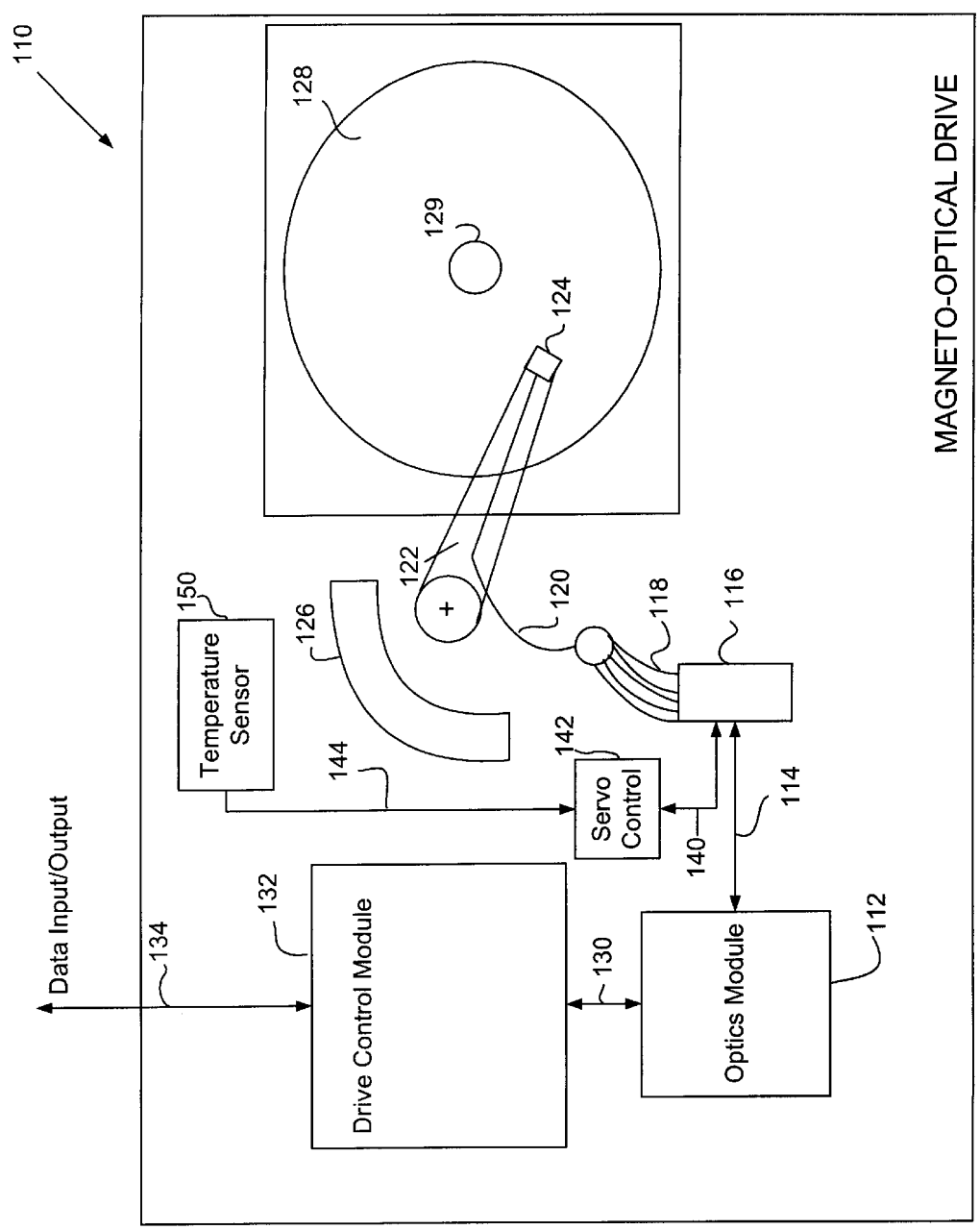
FIG. 1 is a pictorial view of a magneto-optical drive, according to one embodiment of the present invention.

Referring now to FIG. 1, a pictorial view of one embodiment of a magneto-optical drive 110 is shown. Although a magneto-optical drive is discussed here, other types of optical systems, for example an optical drive, are within the scope of the present invention. Indeed, the present invention may be practiced wherever optical switching is performed. Magneto-optical drive 110 preferably uses laser-generated light beams to carry information. In the FIG. 1 embodiment, magneto-optical drive 110 includes an optics module 112, an optical pathway 114, an optical switch 116, a fiber bundle 118, an actuator magnet and coil 126, a plurality of head arms 122, a plurality of magneto-optical heads 124, a plurality of magneto-optical storage media 128, a drive control module 132, a servo control 142, and a temperature sensor 150.

Each of the plurality of magneto-optical storage media 128 are mounted on a spindle 129 for continuous rotation at a constant angular velocity, and each of the plurality of magneto-optical heads 124 is preferably attached via a head arm 122 to electromagnetic actuator magnet and coil 126.

Optics module 112 both generates the laser light used to illuminate spots on magneto-optical storage media 128 and processes light reflected from magneto-optical storage media 128. Optical pathway 114, optical switch 116, fiber bundle 118, and magneto-optical heads 124 form an optical path that maintains the polarization mode of light traveling though the path. During read operations, optics module 112 sends a polarized beam to magneto-optical storage media 128, and then analyzes the returning beam for polarization status. Depending upon the plane of polarization of the returning beam as compared to the plane of polarization of the incident beam, a 1 or a 0 is read from data locations on magneto-optical storage media 128. During write operations, the laser of optics module 112 may be pulsed at an increased intensity. The increased intensity beam may be used to quickly heat a data location above the Curie point temperature, which is defined as the temperature above which a magnetic domain may have its direction changed upon application of a small magnetic field. Raising the temperature of a data location above the Curie point allows a magnet in magneto-optical head 124 to change the magnetic domain structure and hence the polarization reflectivity of the data location on magneto-optical storage media 128.

In the FIG. 1 embodiment, optical switch 116 receives light through optical pathway 114 and routes the light to one of a plurality of fibers in fiber bundle 118. The switching properties of optical switch 116 are bi-directional, so that light reflected back to optical switch 116 from magneto-optical storage media 128 along one of the fibers in fiber bundle 118 may also be routed to optical pathway 114. Each fiber of fiber bundle 118 is preferably routed along a respective head arm 122 to a respective magneto-optical head 124 and magneto-optical storage media 128.

A reflected light signal from magneto-optical storage media 128 couples back through magneto-optical head 124, one of the fibers in fiber bundle 118, optical switch 116, and reaches optics module 112 via optical pathway 114. Optics module 112 then converts the light signal to an electronic signal, which is then transmitted to drive control module 132 via data pathway 130. Drive control module 132 communicates the data represented by the electronic signal to a computer (not shown) via data input/output 134.

Figure 2:
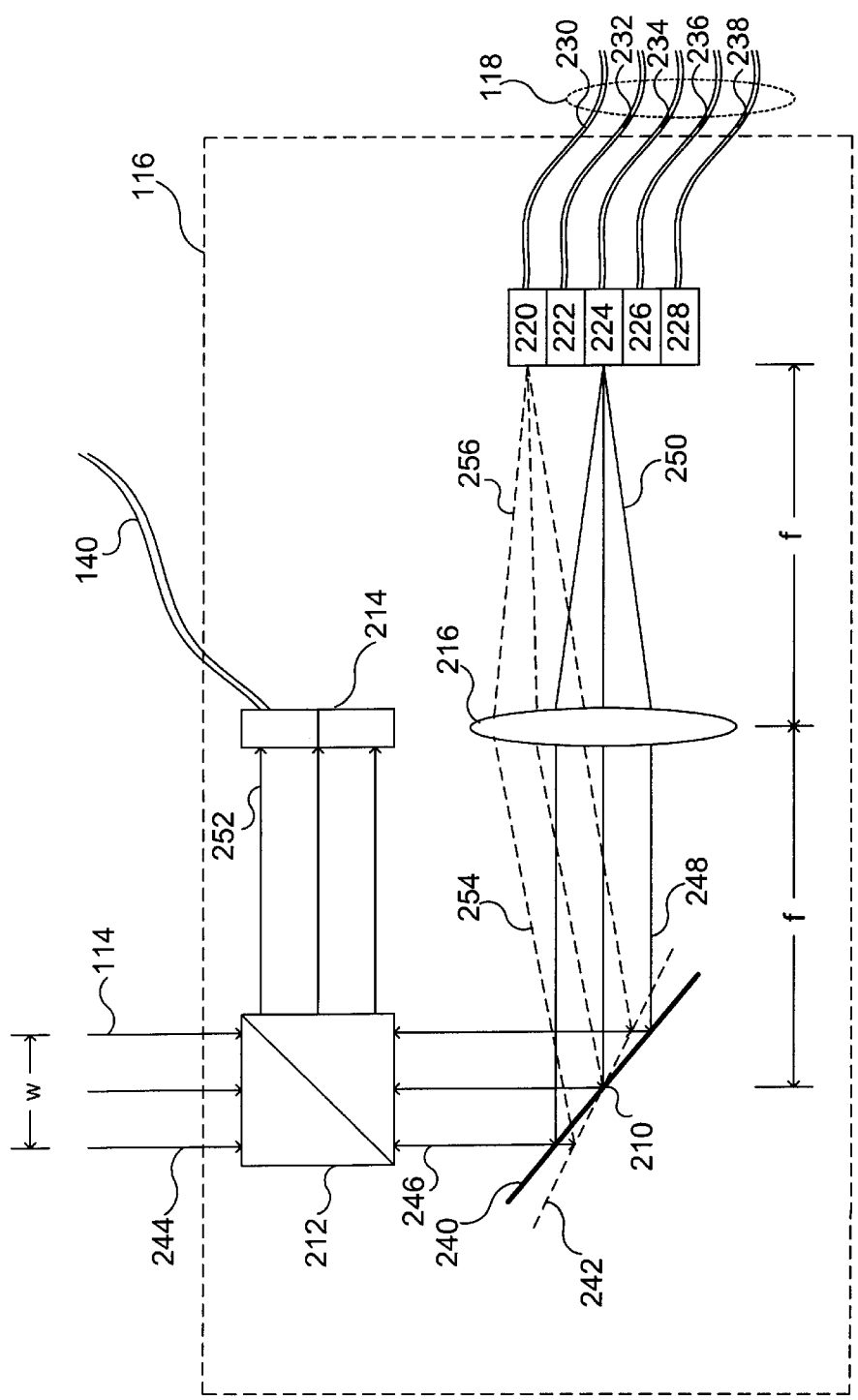
FIG. 2 is a pictorial view of the optical switch of FIG. 1, according to one embodiment of the present invention.

Referring now to FIG. 2, a pictorial view of the optical switch 116 of FIG. 1 is shown, according to one embodiment of the present invention. In the FIG. 2 embodiment, a movable beam deflection mirror 210 performs the optical switching. In alternate embodiments, such as the embodiment described below in conjunction with FIG. 8, other types of beam deflectors may perform optical switching.

Optics module 112 sends an incident beam of laser light into optical switch 116 via optical pathway 114. Optical pathway 114 terminates in a beam path 244, which directs the incident beam through a beam splitter 212. The beam traverses beam splitter 212 and impinges upon beam deflection mirror 210. Beam deflection mirror 210 may assume several positions under control of rotational motors (not shown). In FIG. 2, two exemplary positions are shown: a first position 240 and a second position 242.

Considering first the case where beam deflection mirror 210 is in first position 240, the incident beam travels first along a beam path 246 and is then reflected along a first beam path 248. A beam focusing lens 216 then focuses the incident beam along a first beam path 250 where the beam nominally impinges upon the center of a fiber terminator 224. Fiber terminator 224 provides a mechanical support for, as well as a free-space beam to fiber-optic beam interface for, a fiber 234, allowing the incident beam to be injected into fiber 234. Once inside fiber 234, the incident beam traverses fiber 234 to magneto-optical head 124, reflects from magneto-optical storage media 128, and returns as a return beam.

Since the incident beam was injected nominally upon the center of fiber terminator 224, the return beam retraces the optical pathway comprising fiber 234, fiber terminator 224, first beam path 250, beam focusing lens 216, first beam path 248, beam deflection mirror 210 in first position 240, and beam path 246. Beam splitter 212 passes a large portion of the return beam straight on to a beam path 244, but sends the remainder of the return beam at an angle along a beam path 252. The portion of the return beam traversing beam path 252 impinges upon a quadrant detector 214, shown in profile in FIG. 2. Quadrant detector 214 is further discussed below in conjunction with FIG. 5.

In the FIG. 2 embodiment of optical switch 116, fiber terminators 220 through 228 have surfaces that are angle-cleaved to prevent any light from the incident beam reflected back from the surfaces of fiber terminators 220 through 228 from entering beam focusing lens 216 along a return beam path. Light from the incident beam reflected back from the surfaces of fiber terminators 220 through 228 may be mistaken as the return beam by quadrant detector 214, degrading the performance and accuracy of quadrant detector 214.

In the FIG. 2 example, during the manufacture of optical switch 116, quadrant detector 214 is installed so that, when the incident beam is exactly incident upon the center of fiber terminator 224 at nominal operating temperatures, the return beam is exactly incident upon the center of quadrant detector 214.

When beam deflection mirror 210 is in second position 242, the incident beam travels first along a beam path 246 and is then reflected along a second beam path 254. Beam focusing lens 216 then focuses the incident beam along second beam path 256 where the beam nominally impinges upon the center of a fiber terminator 220. Once inside a fiber 230, the incident beam traverses fiber 230 to magneto-optical head 124, reflects from magneto-optical storage media 128, and returns as the return beam.

Again, since the incident beam was injected nominally upon the center of fiber terminator 220, the return beam retraces the optical pathway comprising fiber 230, fiber terminator 220, second beam path 256, beam focusing lens 216, second beam path 254, beam deflection mirror 210 in second position 242, and beam path 246. This retracing of the incident beam path by the return beam occurs independent of which fiber terminator 220 through 228 is selected. In the FIG. 2 embodiment of optical switch 116, a significant design consideration is to ensure that the return beam traverses the same beam path 246 independent of which fiber terminator 220 through 228 is selected by beam deflection mirror 210 and beam focusing lens 216. This design consideration is implemented by designing the relative geometry of beam deflection mirror 210, beam focusing lens 216, and fiber terminators 220 through 228. In other embodiments of optical switch 116, alternate optical elements could be used. Additionally, the number of fiber terminators 220 through 228 is not limited to the exemplary 5 of FIG. 2, but may be any number required.

In each case, independent of which fiber terminator 220 through 228 is selected, beam splitter 212 passes a large portion of the return beam along beam path 244, but sends the remainder of the return beam at an angle along beam path 252. In the FIG. 2 embodiment of optical switch 116, whenever the incident beam is exactly incident upon the center of fiber terminator 220 through 228, the return beam is exactly incident upon the center of quadrant detector 214.

Figure 3:
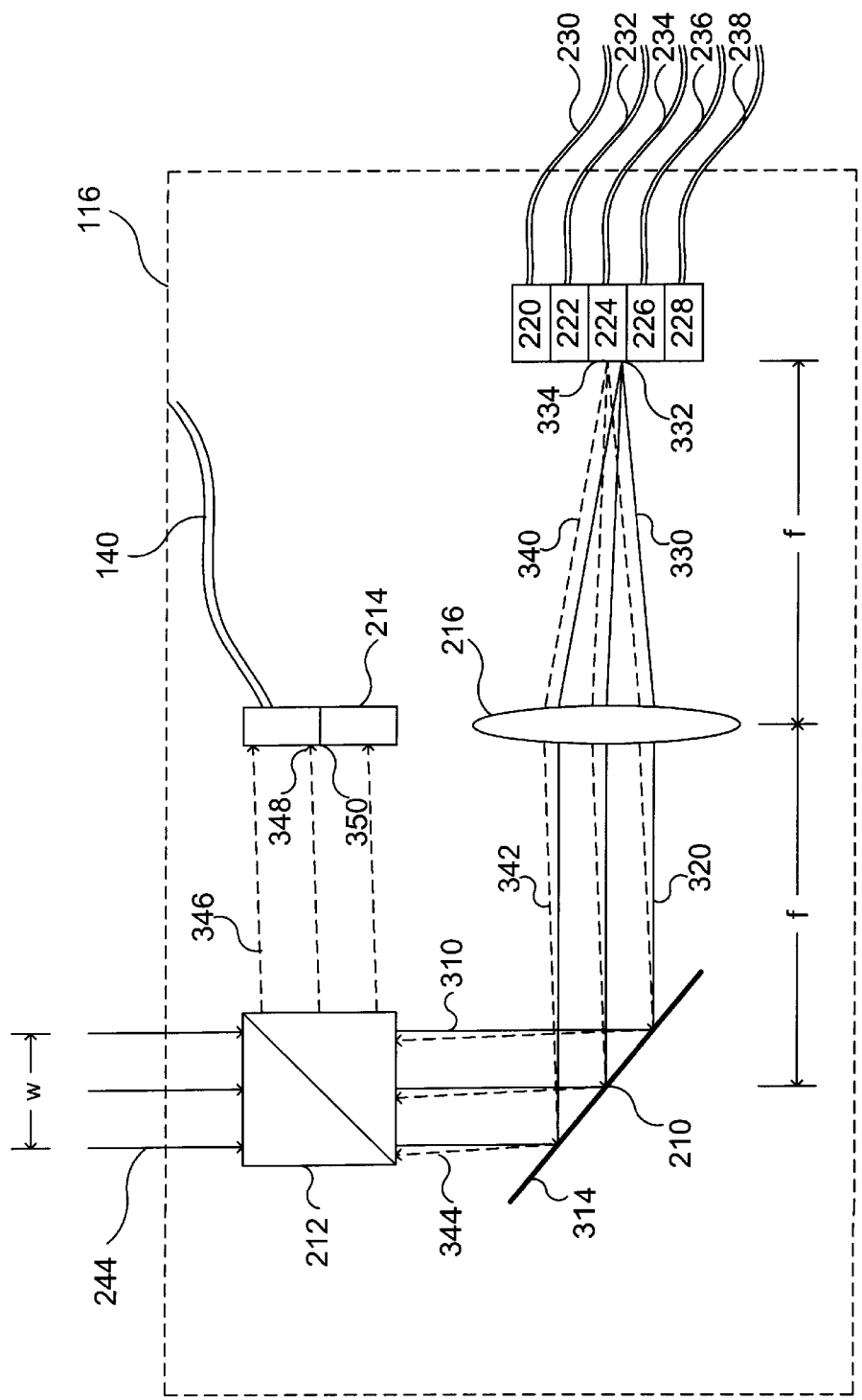
FIG. 3 is a pictorial view of the FIG. 2 switch embodiment showing a first error optical path, according to the present invention.

Referring now to FIG. 3, a pictorial view of the FIG. 2 optical switch showing a first error optical path is shown, according to the present invention. In the FIG. 2 example, the operation of optical switch 116 was shown for nominal optical paths of both incident and return beam paths. In the FIG. 3 example, the relative geometry of beam deflection mirror 210, beam focusing lens 216, and fiber terminator 224 contains a positional error. This error may be caused by vibration, temperature changes, mechanical aging, or many other causes. Due to the positional error, the incident beam path is not incident upon an axial center 334 of fiber terminator 224, but rather is incident upon an offset position 332 of fiber terminator 224.

In the FIG. 3 example, the incident beam traverses beam path 244, beam splitter 212, an incident beam path 310, and then reflects from beam deflection mirror 210 in a position 314. The incident beam then traverses an incident beam path 320, beam focusing lens 216, an incident beam path 330, and then impinges upon offset position 332 of fiber terminator 224.

In optical fibers, when an incident beam impinges off-center upon a fiber terminator, the result is that a beam of lesser intensity travels down the center of the fiber. The value of the resulting beam intensity expressed as a percentage of the incident beam intensity is defined as the coupling efficiency. In the FIG. 3 embodiment, when the incident beam impinges upon offset position 332 of fiber terminator 224, the result is a beam traveling down the center of fiber 234 with an intensity equal to the intensity of the incident beam multiplied by the coupling efficiency.

When the return beam returns along fiber 234 from magneto-optical storage media 128, the return beam is centered in fiber 234. The return beam therefore exits at axial center 334 of fiber terminator 224. Since the return beam exits at a different location than the incident beam entered fiber terminator 224, a distinct return beam path 340 leads from axial center 334 through beam focusing lens 216. After traversing beam focusing lens 216, the return beam follows a return beam path 342 and strikes beam deflection mirror 210 at position 314. The angle at which return beam path 342 strikes beam deflection mirror 210 is different than the angle at which incident beam path 320 leaves beam deflection mirror 210. Therefore the return beam is returned from beam deflection mirror 210 along a return beam path 344 which is at an angle to beam path 310. Return beam path 344 being at an angle to beam path 310 causes the portion of the return beam diverted by beam splitter 212 to travel along an angled beam path 346. The center of the portion of the return beam traveling along angled beam path 346 impinges upon quadrant detector 214 at an angled beam center 348, at a location offset from center location 350 of quadrant detector 214.

Due to the design of the relative geometry of the optical components in optical switch 116, the distance between center location 350 of quadrant detector 214 and angled beam center 348 varies monotonically with the distance between axial center 334 and offset position 332 of fiber terminator 224. For this reason, currents generated by photodiodes of quadrant detector 214 will be proportional to the distance between axial center 334 and offset position 332 of fiber terminator 224. Therefore, the currents generated by the photodiodes of quadrant detector 214 are a direct measurement of any misalignment of the incident beam and fiber terminator 224 of fiber 234. The magnitudes of the currents generated by the photodiodes of quadrant detector 214 are discussed below in conjunction with FIGS. 5 and 6.

Figure 4:
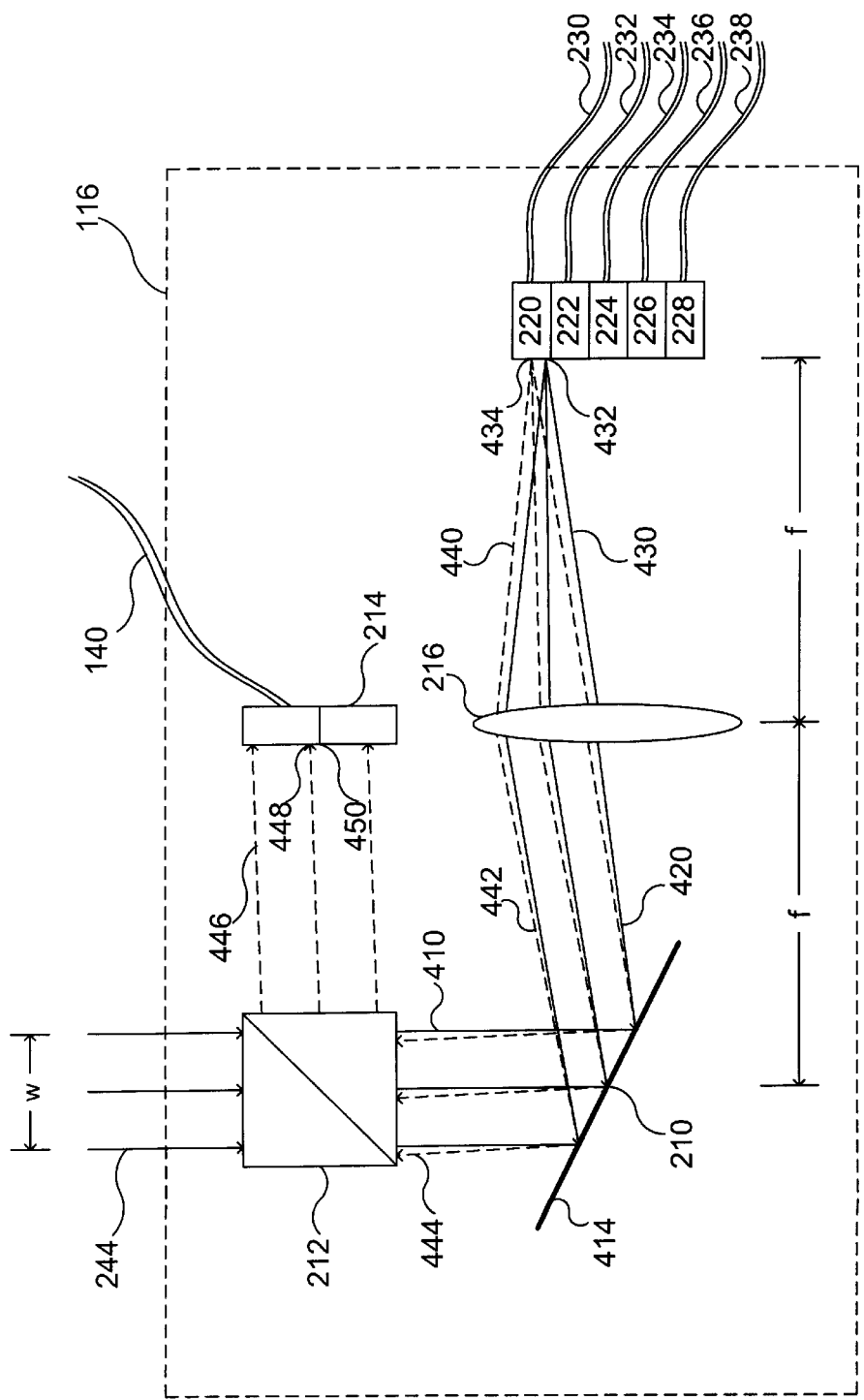
FIG. 4 is a pictorial view of the FIG. 2 switch embodiment showing a second error optical path, according to the present invention.

Referring now to FIG. 4, a pictorial view of the FIG. 2 optical switch showing a second error optical path is shown, according to the present invention. In the FIG. 4 embodiment, as in the FIG. 3 embodiment, a positional error exists in the relative geometry of beam deflection mirror 210, beam focusing lens 216, and the relevant fiber terminator 220.

In FIG. 4, an incident beam travels along beam path 244, through beam splitter 212, and then along a beam path 410. The incident beam then reflects from beam deflection mirror 210 at a mirror position 414. After reflecting from beam deflection mirror 210, the incident beam travels along an incident beam path 420, through beam focusing lens 216, and then along an incident beam path 430. The incident beam impinges upon fiber terminator 220 at an offset position 432.

As in the FIG. 3 example, the result of the incident beam impinging at offset position 432 is that a beam travels down the center of fiber 230 with an intensity equal to the intensity of the incident beam multiplied by the coupling efficiency. Again, in the FIG. 4 example the return beam emerges from an axial center 434 of fiber terminator 220 and traverses a distinct beam path consisting of a return beam path 440, a return beam path 442, and a return beam path 444. Beam splitter 212 again diverts a portion of the return beam along an angled beam path 446 to impinge upon quadrant detector 214 at an angled beam center 448. The displaced location of angled beam center 448 relative to a center location 450 of quadrant detector 214 generates currents in the photodiodes of quadrant detector 214, which are a direct measurement of the misalignment of the incident beam and fiber terminator 220 of fiber 230.

In general, for incident beams striking any fiber terminator 220 through 228 of fibers 230 through 238, the design of optical switch 116 with quadrant detector 214 generates electrical signals that represent a direct measurement of any misalignment of the incident beam and the targeted fiber terminator. The actual number and arrangement of the fiber terminators is not crucial to the present invention, nor is the actual implementation of the optical switching deflector. The optical switching deflector may be beam deflection mirror 210 of FIGS. 2, 3, and 4, or any other optical path modifying device.

Figure 5:
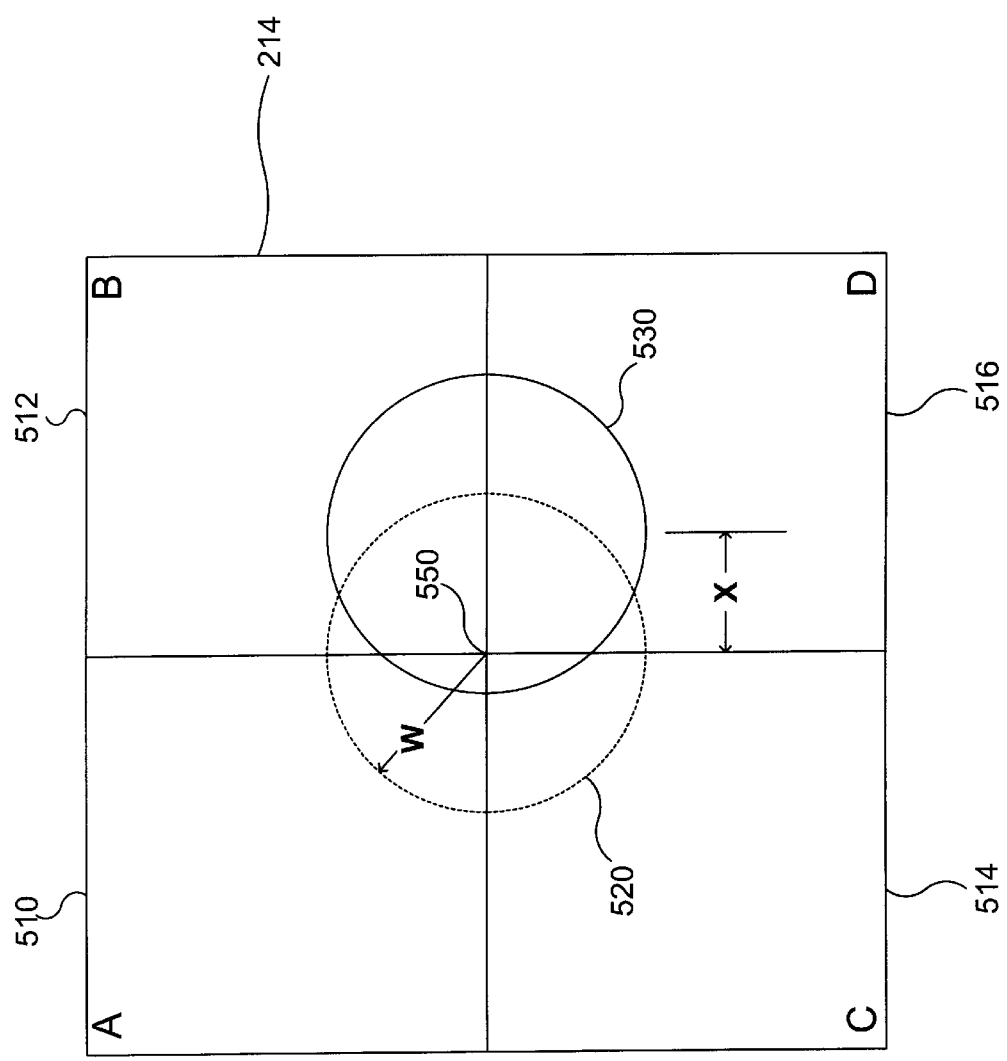
FIG. 5 is a pictorial view of optical beams impinging on the quadrant detector of FIG. 2, according to one embodiment of the present invention.

Referring now to FIG. 5, a pictorial view of optical beams impinging on quadrant detector 214 of FIG. 2 is shown, according to one embodiment of the present invention. In FIG. 5, a geometric circle represents the location of optical beams. An optical beam does not have equal intensity across the beam, but rather varies continuously in intensity. A common representation of beam intensity versus radial distance from beam center is a normal Gaussian curve. A useful measurement of the size of the beam is the radius of the circle at whose points the beam intensity is a fixed proportion of the beam maximum intensity. For Gaussian intensity distributions, this fixed proportion is typically chosen as $1/e^2$ for computational ease. In FIG. 5, a centered beam 520 and an offset beam 530 are circular representations with radius W of incident beams, where the circles define the locations where the beam intensity is $1/e^2$ of the maximum intensity.

Quadrant detector 214 includes four areas, each defining a photodiode. The FIG. 5 embodiment shows four square photodiodes with a common vertex 550 at the center of quadrant detector 214. These four photodiodes are A photodiode 510, B photodiode 512, C photodiode 514, and D photodiode 516. In alternate embodiments, the photodiodes may have shapes other than squares. The photodiodes may have common or independent anodes and cathodes. In the FIG. 5 embodiment, A photodiode 510, B photodiode 512, C photodiode 514, and D photodiode 516 have a common cathode but each possesses an independent anode.

Anode currents of A photodiode 510, B photodiode 512, C photodiode 514, and D photodiode 516 are each proportional to the amount of light incident upon the respective areas of the photodiodes. Let $S_A$ be the anode current of A photodiode 510, $S_B$ be the anode current of B photodiode 512, $S_C$ be the anode current of C photodiode 514, and $S_D$ be the anode current of D photodiode 516. Then, when centered beam 520 impinges upon quadrant detector 214, $S_A = S_B = S_C = S_D$.

In the case of offset beam 530, the above equality does not hold. Offset beam 530 is offset horizontally from common vertex 550 by an amount X. In this case, $S_A$ and $S_C$ are smaller than $S_B$ and $S_D$ because A photodiode 510 and C photodiode receive less illumination than B photodiode 512 and D photodiode 516. A horizontal error signal (HES) and a vertical error signal (VES) may be defined by the following equations:

$$HES = (S_B + S_D) - (S_A + S_C)/(S_A + S_B + S_C + S_D) \qquad \text{Equation 1}$$

$$VES = (S_A + S_B) - (S_C + S_D)/(S_A + S_B + S_C + S_D) \qquad \text{Equation 2}$$

The HES function is discussed below in conjunction with FIG. 6. A circuit that extracts and utilizes HES and VES from the anode currents is discussed below in conjunction with FIG. 7. The values of HES and VES may be used as inputs to a servo-control mechanism that performs fine-adjustment of beam deflection mirror 210 of FIGS. 2, 3, and 4.

Figure 6:
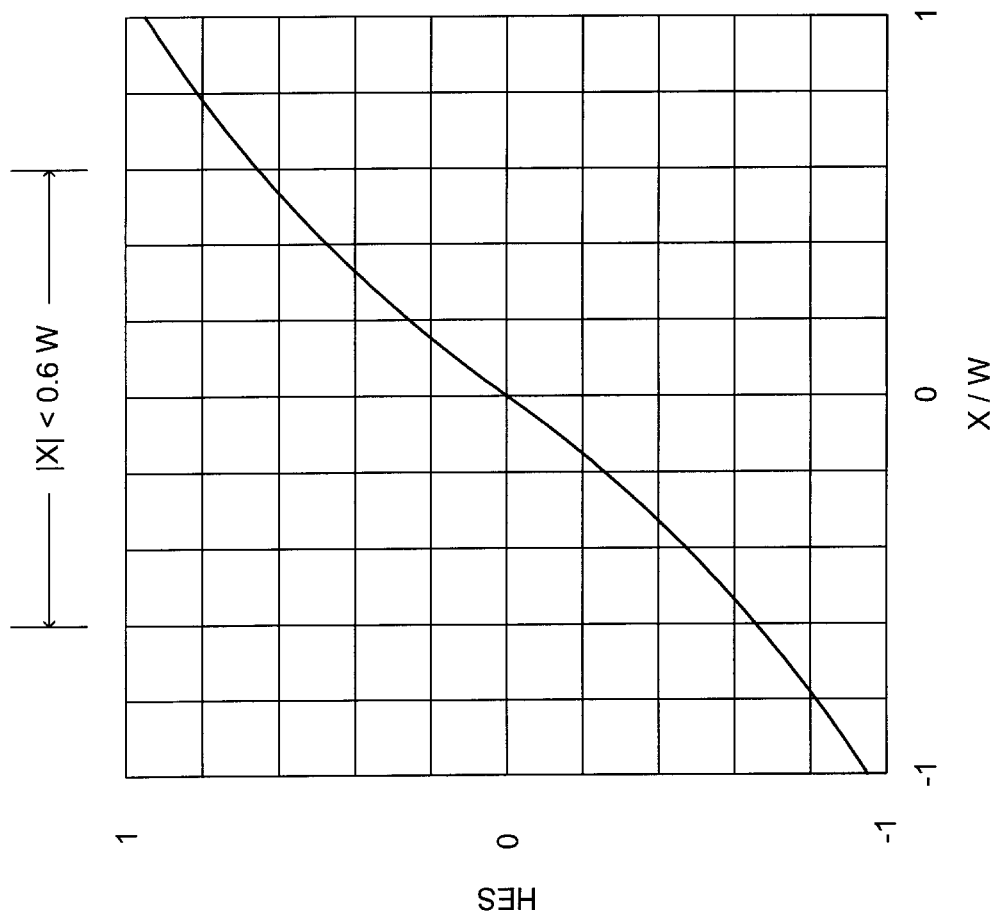
FIG. 6 is a graph of a horizontal error signal as a function of beam position error, according to one embodiment of the present invention.

Referring now to FIG. 6, a graph of the horizontal error signal (HES) as a function of the beam position error is shown, according to one embodiment of the present invention. In FIG. 6, W and X are the quantities defined above in conjunction with FIG. 5. FIG. 6 shows the values of HES along the vertical axis as a function of the ratio of the offset from center X to the beam radius W. It is noteworthy that HES is approximately linear with the variable X/W over the range $|X| < 0.6$ W. In one embodiment of the present invention, X is limited to this range for the purpose of fine-adjustment control. For values of X exceeding this range, a coarse-adjustment control method is used.

Figure 7:
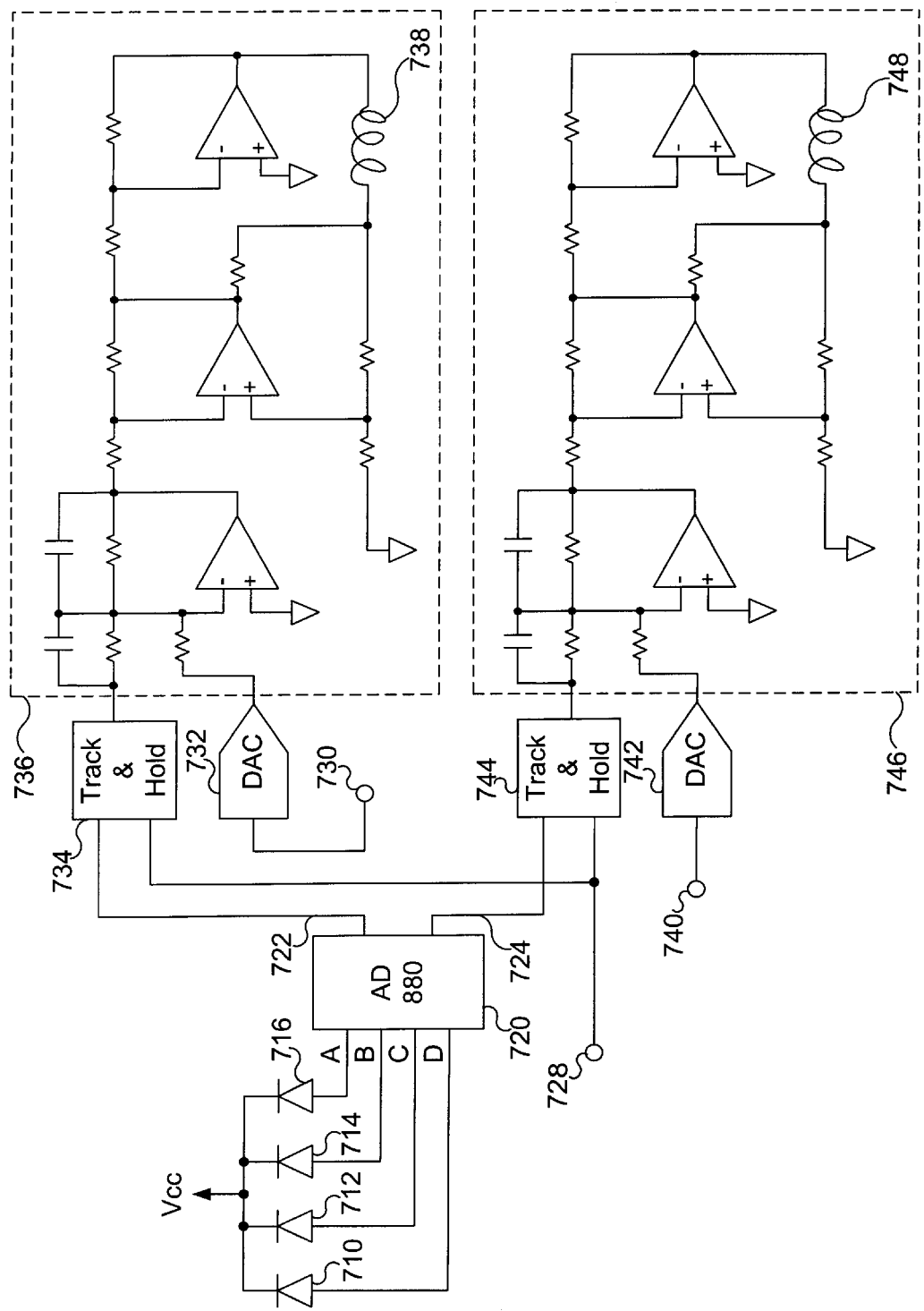
FIG. 7 is a schematic diagram of a fine-adjustment servo-control circuit, according to one embodiment of the present invention.

Referring now to FIG. 7, a schematic diagram of a fine-adjustment servo-control circuit is shown, according to one embodiment of the present invention. The circuit of FIG. 7 may be used to keep the incident beam traversing optical switch 116 centered on the axial center of the selected fiber terminator. In the FIG. 7 embodiment, an integrated circuit containing Gilbert cells, the Analog Devices AD880 (720), performs the analog algebra necessary to create HES and VES from the photodiode anode currents, according to Equations 1 and 2 above. The HES and VES analog signals may then drive the servo-control circuitry that performs fine-adjustment of the beam deflection mirror 210 of FIGS. 2, 3, and 4.

In the FIG. 7 embodiment, A photodiode 710, B photodiode 712, C photodiode 714, and D photodiode 716 may be the photodiodes of quadrant detector 214 of FIGS. 2, 3, and 4. The cathodes of A photodiode 710, B photodiode 712, C photodiode 714, and D photodiode 716 are tied to a constant voltage source (Vcc). The anodes of A photodiode 710, B photodiode 712, C photodiode 714, and D photodiode 716 are connected to inputs A, B, C, and D, respectively, of AD880 720. The Gilbert cells of AD880 720 perform the analog algebra necessary to create HES output 722 and VES output 724 in accordance with Equations 1 and 2 above.

The HES output 722 and VES output 724 drive a horizontal track and hold circuit 734 and a vertical track and hold circuit 744, respectively. When a position hold input 728 enables fine-adjustment, horizontal track and hold circuit 734 and vertical track and hold circuit 744 send error signals to a horizontal lead/lag circuit 736 and a vertical lead/lag circuit 746, respectively. A horizontal position control input 730 and a vertical position control input 740 send digital control information to a horizontal digital-to-analog-converter (DAC) 732 and a vertical DAC 742. Horizontal DAC 732 and vertical DAC 742 then send analog compensation signals to horizontal lead/lag circuit 736 and vertical lead/lag circuit 746, respectively.

Utilizing the error signals and analog compensation signals, horizontal lead/lag circuit 736 and vertical lead/lag circuit 746 drive currents in a horizontal redirection motor 738 and a vertical redirection motor 748 to minimize the values of HES and VES, respectively. By minimizing the values of HES and VES, which are direct measurements of the offset of the incident beam from the axial center of the selected fiber terminator, the circuit of FIG. 7 maintains the incident beam at the axial center of the selected fiber terminator.

Figure 8:
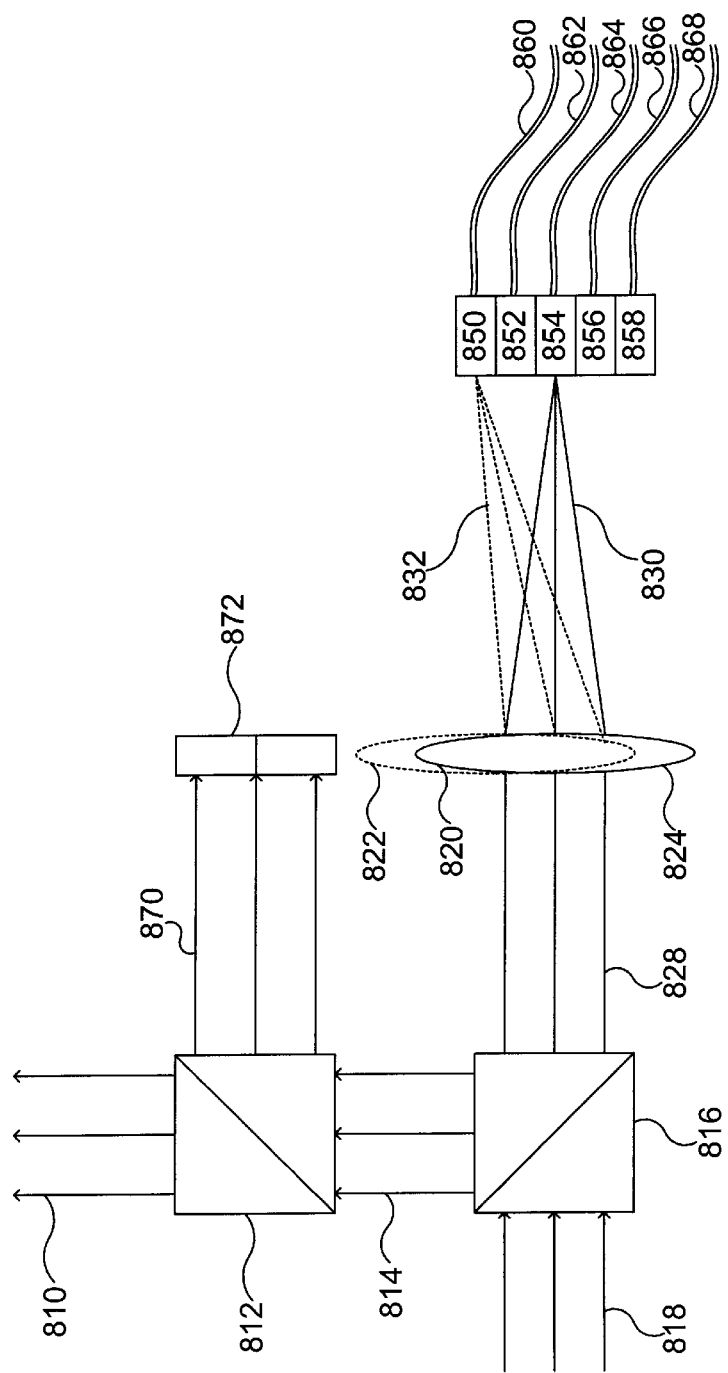
FIG. 8 is a pictorial view of the optical switch of FIG. 1, according to an alternate embodiment of the present invention.

Referring now to FIG. 8, a pictorial view of the optical switch 116 of FIG. 1 is shown, according to an alternate embodiment of the present invention. In the FIG. 2 embodiment, the incident beam is switched to one among several fiber terminators by beam deflection mirror 210. In the FIG. 8 alternate embodiment, the incident beam is switched to one among several fiber terminators by a movable beam deflection lens 820.

In the FIG. 8 embodiment, the incident light beam enters optical switch 116 along an incident beam path 818. The incident beam traverses a beam splitter 816, and travels along a beam path 828 to beam deflection lens 820. In the FIG. 8 example, beam deflection lens 820 is alternately shown in a first position 824 and a second position 822. When the incident beam strikes beam deflection lens 820 in first position 824, the incident beam is focused along a beam path 830 and impinges upon a fiber terminator 854 of a fiber 864. The incident beam then travels along fiber 864, reflects from magneto-optical storage media 128, and returns along fiber 864 as a return beam. The return beam then traverses beam path 830, beam deflection lens 820 in first position 824, beam path 828, and is then diverted by beam splitter 816. The return beam travels along a return beam path 814, where part of the return beam is diverted by a beam splitter 812 along a beam path 870 to impinge upon a quadrant detector 872. In a manner similar to that discussed above in conjunction with FIGS. 2 and 3, any amount of offset of the incident beam from the axial center of fiber terminator 854 will be proportional to the amount of offset of the return beam from the center of quadrant detector 872. The method for direct measurement of alignment error as discussed in conjunction with FIGS. 2 and 3 above may therefore be used in the FIG. 8 embodiment of optical switch 116.

If the incident beam strikes beam deflection lens 820 in second position 822, the incident beam is focused along a beam path 832 and impinges upon a fiber terminator 850 of a fiber 860. The incident beam then travels along fiber 860, reflects from magneto-optical storage media 128, and returns along fiber 860 as the return beam. The return beam then traverses beam path 832, beam deflection lens 820 in second position 822, beam path 828, and is then diverted by beam splitter 816. The return beam travels along return beam path 814, where part of the return beam is diverted by beam splitter 812 along beam path 870 to impinge upon quadrant detector 872. Again, any amount of offset of the incident beam from the axial center of fiber terminator 850 will be proportional to the amount of offset of the return beam from the center of quadrant detector 872.

Figure 9:
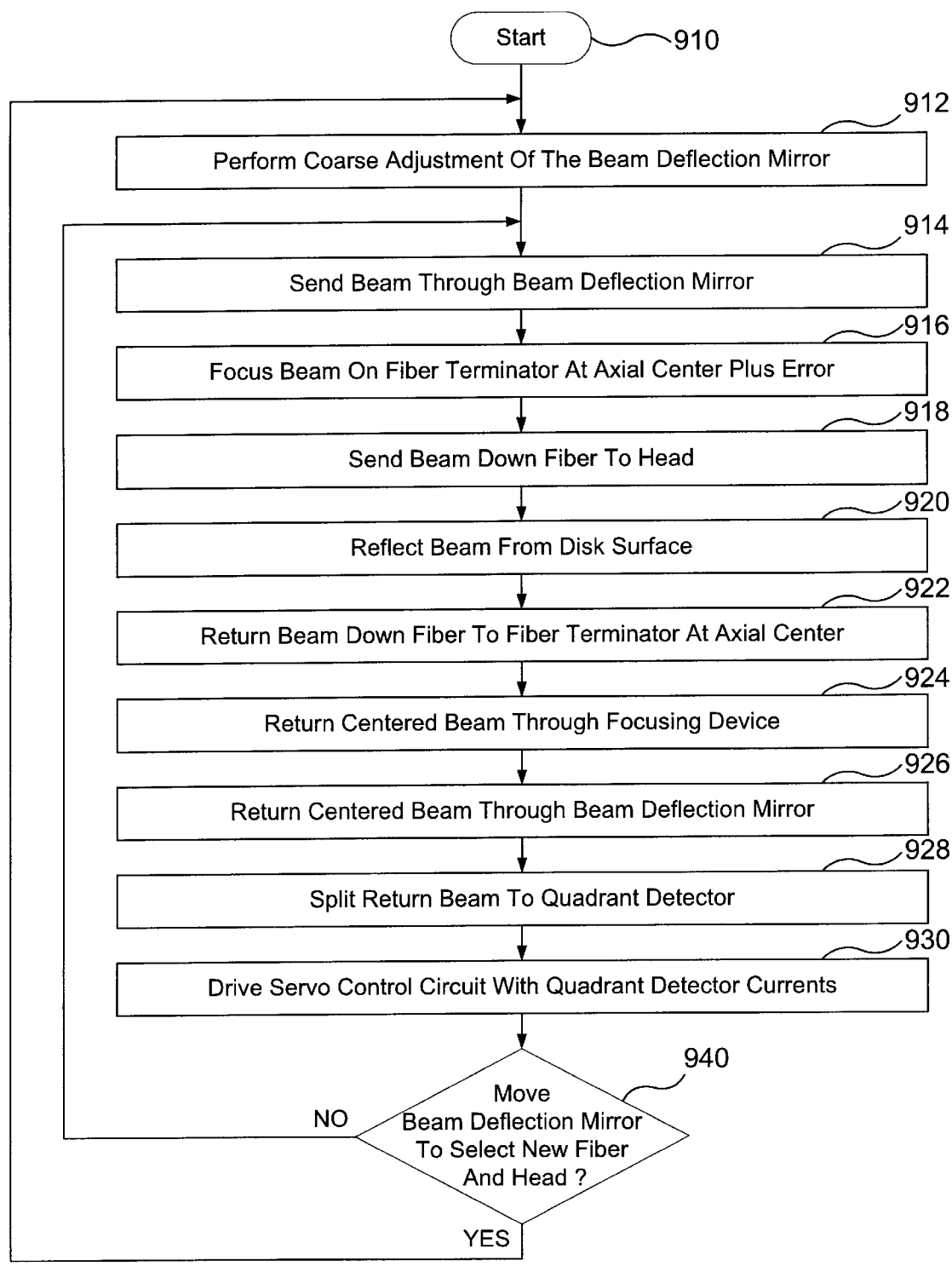
FIG. 9 is a flowchart of a subset of method steps for beam error detection in the optical switch of FIG. 2, according to one embodiment of the present invention.

Referring now to FIG. 9, a flowchart of method steps for beam error measurement in optical switch 116 of FIGS. 2 and 3 is shown, according to one embodiment of the present invention. First, in step 912, coarse-adjustment of beam deflection mirror 210 is performed, after which the fine-adjustment steps 914 through 930 may be performed.

In step 914, the incident beam is sent through beam deflection mirror 210, which may be in a position of geometric error with respect to beam focusing lens 216 and axial center 334 of fiber terminator 224. Then, in step 916, beam focusing lens 216 impinges the incident beam upon fiber terminator 224 at a location an error distance away from axial center 334 of fiber terminator 224. In step 918, the beam travels down fiber 234 to magneto-optical head 124, where, in step 920, the incident beam reflects from magneto-optical storage media 128 and becomes the return beam. Then, in step 922, the return beam travels down fiber 234 and exits fiber 234 at axial center 334 of fiber terminator 224.

The centered return beam departs axial center 334 of fiber terminator 224 in step 924. Since the return beam departs axial center 334 in a different location than the incident beam impinged upon fiber terminator 224, the return beam traverses beam focusing lens 216 along a different path than the incident beam path. Then, in step 926, this return beam traveling along a different path is deflected by beam deflection mirror 210 along a different path than the incident beam path. In step 928, this different path causes beam splitter 212 to send a portion of the return beam to an off-center location on quadrant detector 214. The anode currents in quadrant detector 214 then carry a direct measurement of the alignment error in optical switch 116.

Once the alignment error is measured, then, in step 930, this measured alignment error, coded on the anode currents of quadrant detector 214, may be used to drive a servo-control circuit to finely-adjust beam deflection mirror 210.

If, in step 940, optics module 112 does not select a different fiber, then the FIG. 9 method returns to step 914 to continue fine-adjustment of beam deflection mirror 210. However, if optics module 112 selects a different fiber, the FIG. 9 method returns to step 912 to perform a new coarse-adjustment of beam deflection mirror 210 to select the new fiber and attached magneto-optical head prior to continuing the fine-adjustment method steps 914 through 930.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. An optical switch for use with an incident light beam, comprising first and second optical fibers, a beam positioner for selectively coupling said incident light beam into one of said first and second optical fibers, a quadrant detector for sensing at least a portion of a reflected light beam reflected back out of the one of said first and second optical fibers so as to determine an offset signal corresponding to an offset position between said incident light beam and said reflected light beam and a controller coupled to said quadrant detector and said beam positioner for moving said beam positioner so as to minimize said offset position between said incident light beam and said reflected light beam and thereby increase the coupling efficiency into the one of said first and second optical fibers.

2. The switch of claim 1 wherein said beam positioner includes a pivotable reflector.

3. The switch of claim 2 wherein said beam positioner includes a focusing lens for coupling said incident beam from said reflector into the one of said first and second optical fibers.

4. The switch of claim 1 wherein said optical fiber has a fiber terminator.

5. The switch of claim 4 wherein said fiber terminator has an end face that is angle-cleaved so that any of said incident light beam reflected from said end face does not travel coincident with said reflected light beam.

6. The switch of claim 4 wherein said fiber terminator provides a free-space to fiber-optic beam interface.

7. The switch of claim 1 wherein said beam positioner includes a movable focusing lens.

8. The switch of claim 1 wherein said offset position is an angular offset.

9. The switch of claim 1 wherein said offset position is a distance offset.

10. The switch of claim 1 wherein said quadrant detector includes a photodiode A, a photodiode B, a photodiode C, and a photodiode D.

11. The switch of claim 10 wherein the at least a portion of said reflected beam contacts said quadrant detector at a distance from a center of said quadrant detector.

12. The switch of claim 11 wherein said photodiode A produces a current $S_A$, said photodiode B produces a current $S_B$, said photodiode C produces a current $S_C$, and said photodiode D produces a current $S_D$.

13. The switch of claim 12 wherein said current $S_A$, said current $S_B$, said current $S_C$, and said current $S_D$ each varies as a function of said distance from said center of said quadrant detector.

14. The switch of claim 13 wherein said detector generates a horizontal error signal HES from said current $S_A$, said current $S_B$, said current $S_C$, and said current $S_D$ according to a formula: $HES=(S_B+S_D)-(S_A+S_C)/(S_A+S_B+S_C+S_D)$.

15. The switch of claim 13 wherein said detector generates a vertical error signal VES from said current $S_A$, said current $S_B$, said current $S_C$, and said current $S_D$ according to a formula: $VES=(S_A+S_B)-(S_C+S_D)/(S_A+S_B+S_C+S_D)$.

16. The switch of claim 1 wherein said switch is located in an optical disk drive.

17. A system for measurement of an alignment error between an incident light beam and an optical fiber, comprising an incident beam path configured to allow said incident light beam to impinge upon a fiber terminator of said optical fiber, a return beam path extending from said fiber terminator of said optical fiber and configured to return light from said incident light beam and a quadrant detector configured to measure an offset between said return beam path and said incident beam path, said fiber terminator being located within a fiber-optic switch of an optical disk drive.

18. The system of claim 17 wherein said fiber-optic switch switches a head within said optical disk drive.

19. A system for measurement of an alignment error between an incident light beam and an optical fiber, comprising an incident beam path configured to allow said incident light beam to impinge upon a fiber terminator of said optical fiber, a return beam path extending from said fiber terminator of said optical fiber and configured to return light from said incident light beam and a quadrant detector configured to measure an offset between said return beam path and said incident beam path, said fiber terminator being located within a fiber-optic switch and a current from said quadrant detector driving a servo-control circuit.

20. The system of claim 19 wherein said servo-control circuit drives a beam deflector.

21. The system of claim 20 wherein said beam deflector moves said incident beam path towards an axial center of said fiber terminator.

22. A method of coupling an incident light beam into one of first and second optical fibers using an optical switch having a quadrant detector, comprising the steps of selectively directing said incident light beam along an incident beam path so as to couple said incident light beam into said one of first and second optical fibers, sensing with said quadrant detector at least a portion of a reflected light beam reflected back out of said one of first and second optical fibers so as to determine an offset signal corresponding to an offset position between said reflected light beam and said incident light beam and moving said incident light beam so as to minimize said offset position.

23. The method of claim 22 wherein said optical fiber includes a fiber terminator.

24. The method of claim 23 wherein said fiber terminator has an end face that is angle-cleaved so that any of said incident light beam reflected from said end face does not travel coincident with said reflected light beam.

25. The method of claim 23 wherein said fiber terminator provides a free-space to fiber-optic beam interface.

26. The method of claim 23 wherein said reflected light beam emerges at an axial center of said fiber terminator.

27. The method of claim 22 wherein said offset position is a distance offset.

28. The method of claim 22 wherein said offset position is an angular offset.

29. The method of claim 22 wherein said quadrant detector includes a photodiode A, a photodiode B, a photodiode C, and a photodiode D.

30. The method of claim 29 wherein at least a portion of said reflected light beam contacts said quadrant detector at a distance from a center of said quadrant detector.

31. The method of claim 30 wherein said photodiode A produces a current $S_A$, said photodiode B produces a current $S_B$, said photodiode C produces a current $S_C$, and said photodiode D produces a current $S_D$.

32. The method of claim 31 wherein said current $S_A$, said current $S_B$, said current $S_C$, and said current $S_D$ each varies as a function of said distance from said center of said quadrant detector.

33. The method of claim 32 wherein said detector generates a horizontal error signal HES from said current $S_A$, said current $S_B$, said current $S_C$, and said current $S_D$ according to a formula:

$$HES=(S_B+S_D)-(S_A+S_C)/(S_A+S_B+S_C+S_D).$$

34. The method of claim 32 wherein said detector generates a vertical error signal VES from said current $S_A$, said current $S_B$, said current $S_C$, and said current $S_D$ according to a formula:

$$VES=(S_A+S_B)-(S_C+S_D)/(S_A+S_B+S_C+S_D).$$

35. The method of claim 22 wherein said optical switch is located within an optical disk drive.

36. The method of claim 35 wherein said optical switch switches a head within said optical disk drive.

37. The method of claim 22 wherein said quadrant detector drives a servo-control circuit.

38. The method of claim 37 wherein said servo-control circuit drives a beam positioner in said moving step.

39. The method of claim 38 wherein said beam positioner is a beam deflector.

\* \* \* \* \*